June 12, 1956   G. B. DOREY   2,749,851
SEALING BOLT MECHANISM FOR A DISCHARGE OUTLET
Original Filed Oct. 5, 1951   4 Sheets-Sheet 1
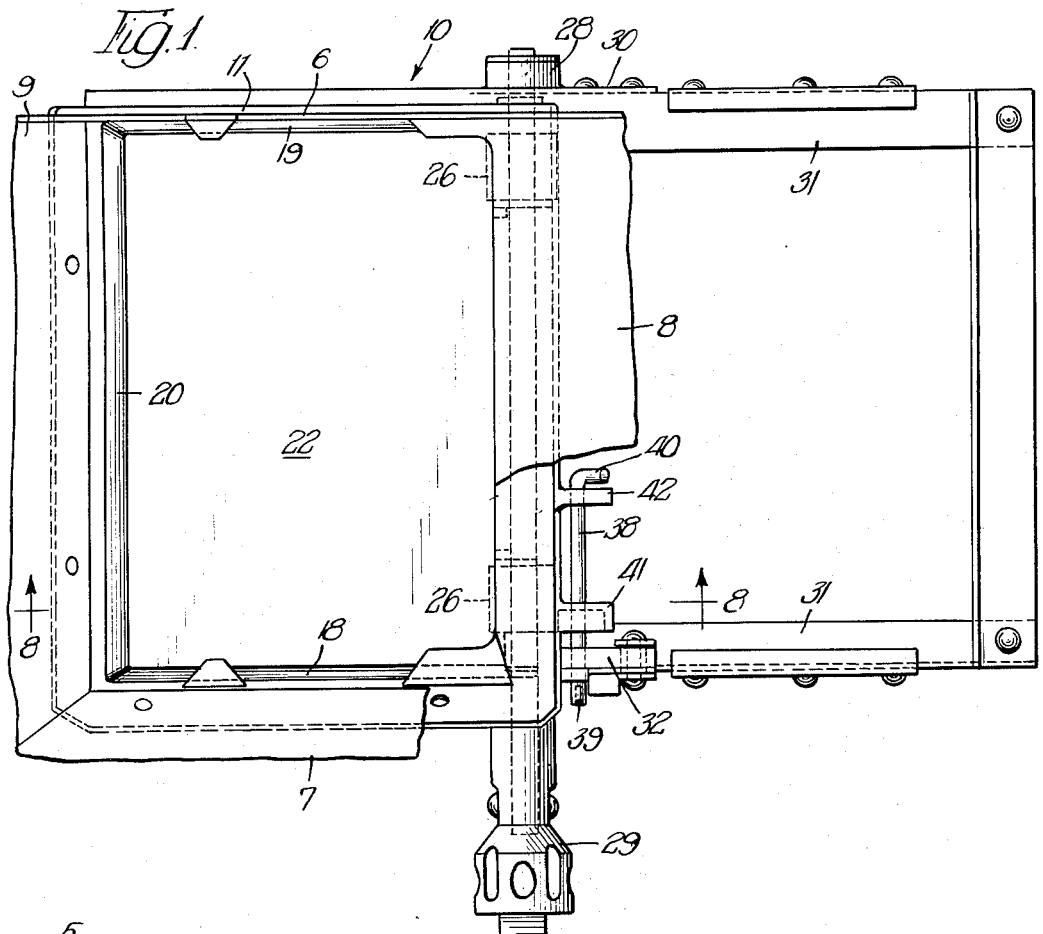
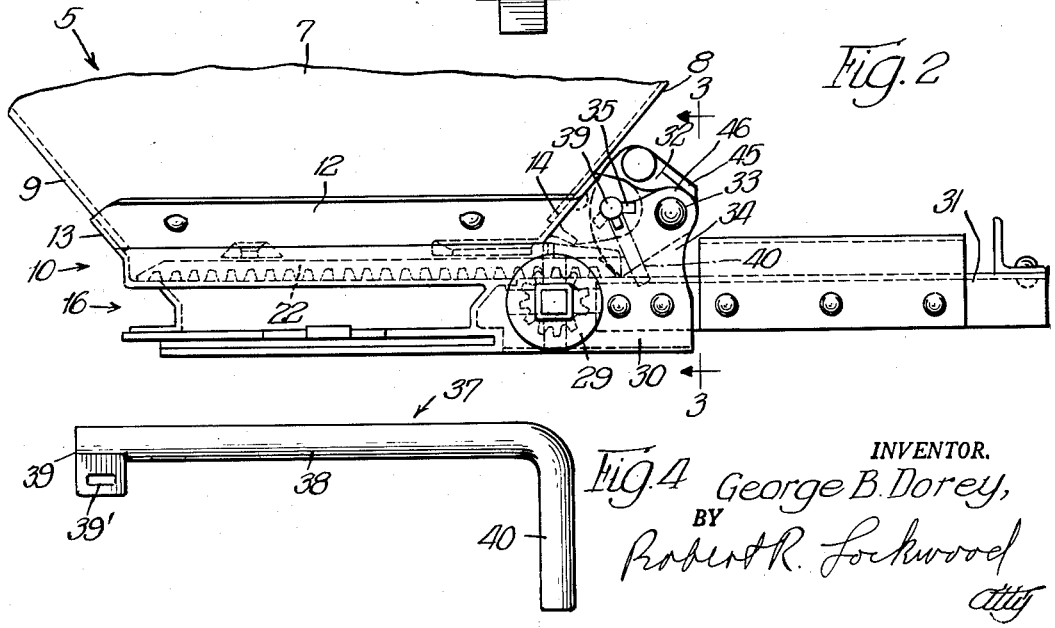
INVENTOR.
George B. Dorey,
BY
Robert R. Lockwood
ATTY

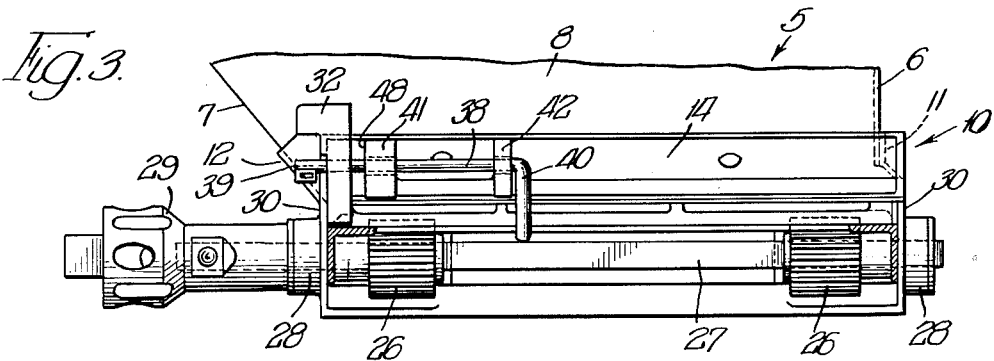
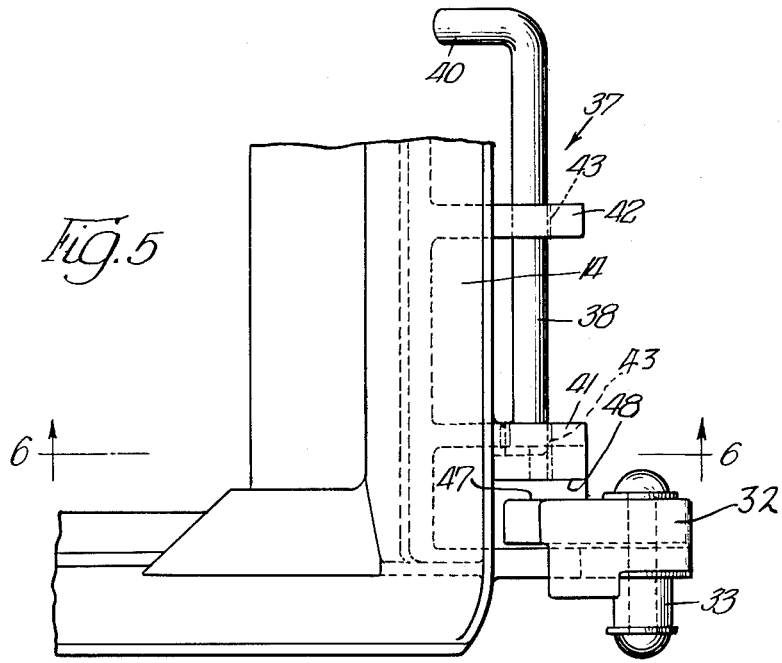
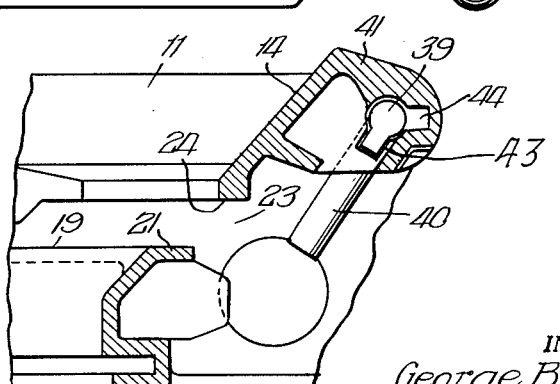

June 12, 1956  G. B. DOREY  2,749,851
SEALING BOLT MECHANISM FOR A DISCHARGE OUTLET
Original Filed Oct. 5, 1951  4 Sheets-Sheet 3
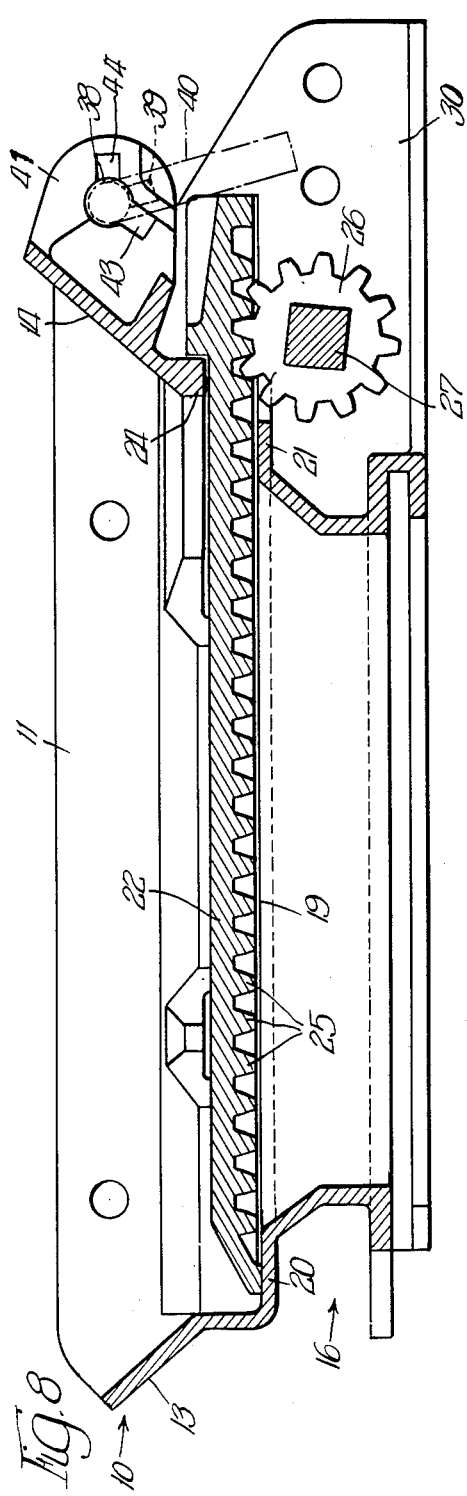
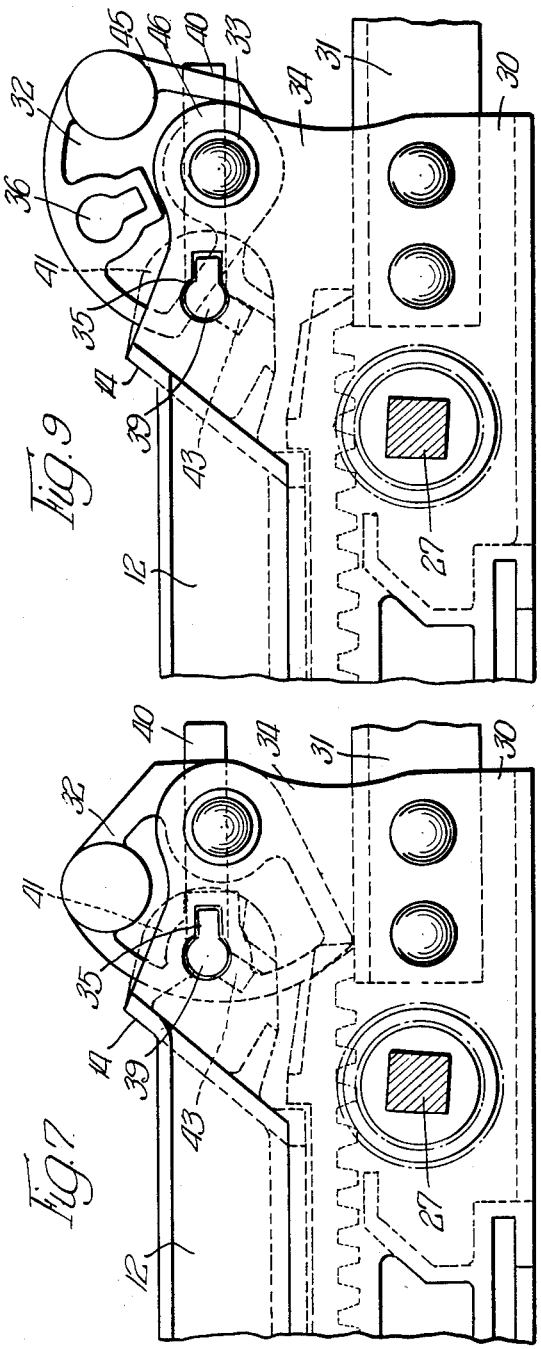
INVENTOR.
George B. Dorey,
BY Robert R. Lockwood
atty June 12, 1956 G. B. DOREY 2,749,851
SEALING BOLT MECHANISM FOR A DISCHARGE OUTLET
Original Filed Oct. 5, 1951 4 Sheets-Sheet 4
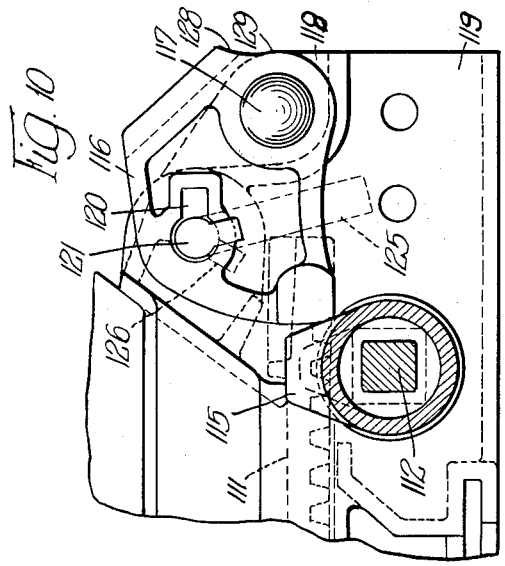
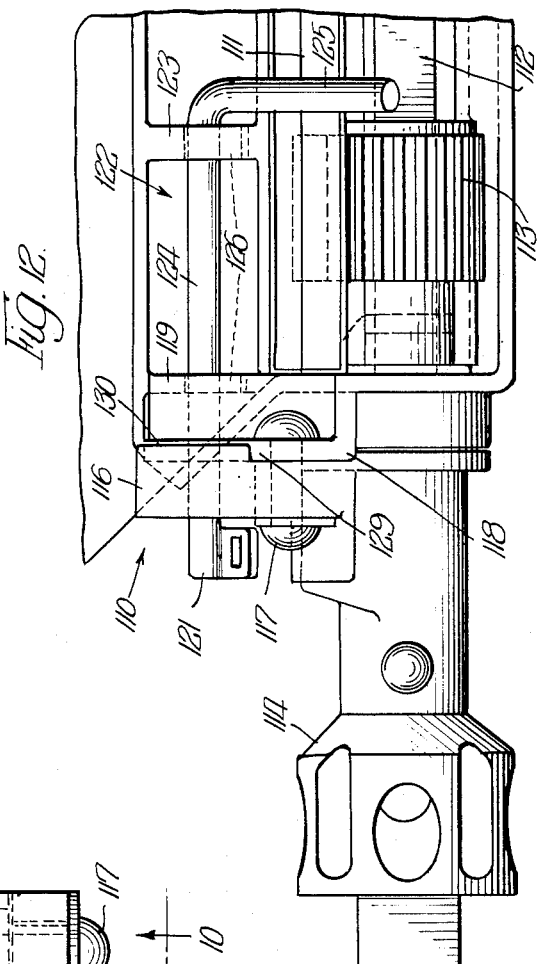
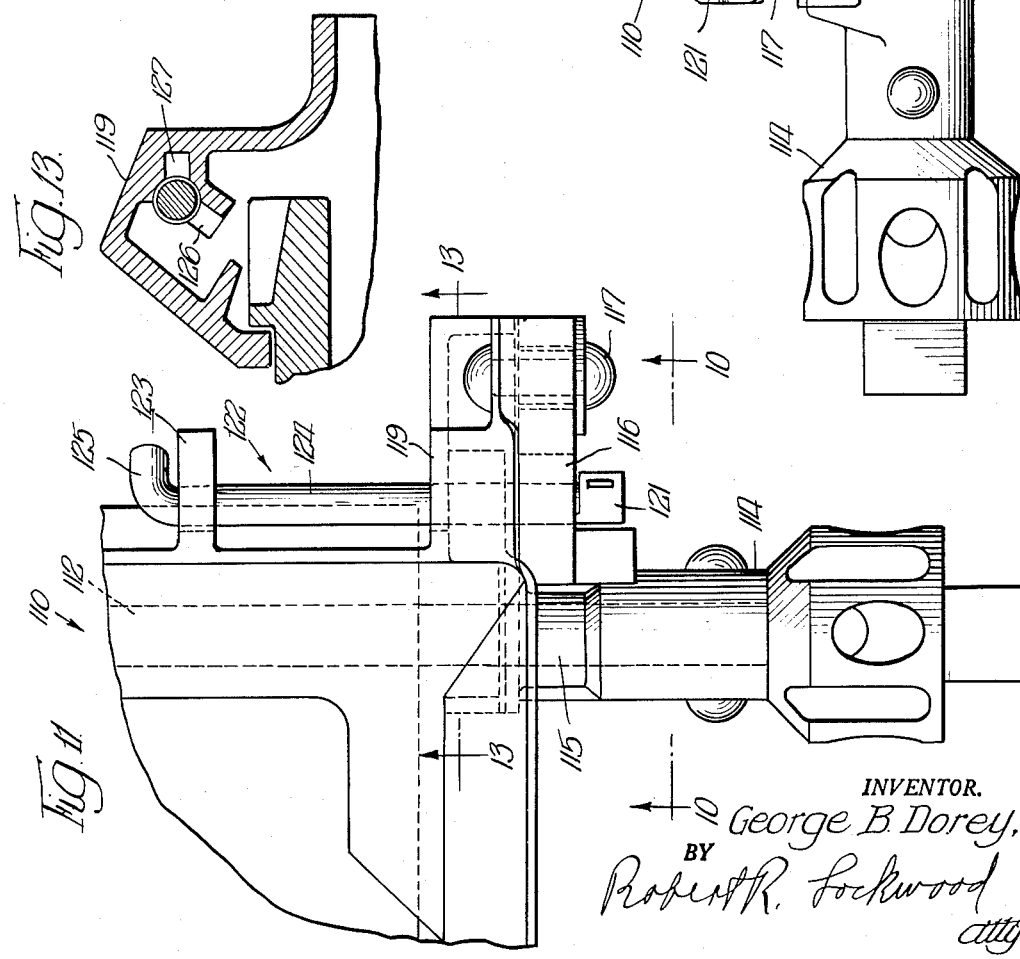
INVENTOR.
George B. Dorey,
BY
Robert R. Lockwood
atty.

United States Patent Office 2,749,851
Patented June 12, 1956

2,749,851

SEALING BOLT MECHANISM FOR A DISCHARGE OUTLET

George B. Dorey, Westmount, Quebec, Canada, assignor to Enterprise Railway Equipment Company, Chicago, Ill., a corporation of Illinois Continuation of abandoned application Serial No. 249,957, October 5, 1951. This application October 4, 1952, Serial No. 313,136

7 Claims. (Cl. 105—308)

The invention relates to an improved sealing bolt mechanism for a discharge outlet and is particularly concerned with that type of discharge outlet having a discharge opening which is closed by means of a sliding gate. This invention is an improvement over the construction disclosed in copending application Serial No. 305,867, filed August 22, 1952, now Patent No. 2,690,-139 issued September 28, 1954, and over application Serial No. 241,761, filed August 14, 1951. This application is a continuation of application Serial No. 249,957 filed October 5, 1951, now abandoned.

The invention is particularly concerned with the means employed for retaining the gate in closed position wherein a pivotally mounted swinging dog is employed to maintain the gate against opening movement and wherein a sealing bolt extends through the dog and frame structure. The invention is by way of an improvement on the structure shown in United States Patent No. 2,072,292, issued March 2, 1937, to Campbell, wherein a two-part sealing bolt is employed and assembly of the two parts effected after insertion of the bolt in its bearing.

The present invention contemplates the use of a one piece sealing bolt and the present invention resides in the structure employed to admit the use of a one piece sealing bolt and in the means employed for limiting axial movement thereof in either direction.

The advantages of my invention among others are in the employment of a one piece sealing bolt which is applied in place without the necessity of using rivets, pins, cotters or any other form of fastening; to provide a sealing bolt which may be applied or removed only when the sliding gate is not assembled and to provide means for retaining the handle of the sealing bolt out of the path of movement of the gate when the latter is opened.

For further comprehension of my invention reference may be had to the accompanying drawings wherein:

Figure 1 is a plan view of a discharge outlet assembly showing the improved sealing pin structure applied thereto, certain parts of the hopper being broken away;

Figure 2 is a side elevational view of the structure shown in Figure 1;

Figure 3 is a vertical end elevational view of the structure shown in Figure 2 as viewed from right to left on a line 3—3 of Figure 2;

Figure 4 is a vertical elevational view of the sealing bolt as seen in detached relation;

Figure 5 is a fractional view of the outlet assembly showing in plan the corner of the outlet structure concerned with the sealing bolt and illustrating the position of the latter during the insertion thereof;

Figure 6 is a vertical longitudinal sectional view through Figure 5 as taken on a line 6—6 of said Figure 5, said view illustrating the position of the bolt handle during insertion;

Figure 7 is a view similar to Figure 6 except that the dog is in locking position in the path of movement of the gate;

Figure 8 is a vertical longitudinal sectional view taken through a line 8—8 of Figure 1 on an enlarged scale and showing in conventional dot and dash lines the limiting position of the sealing bolt when the gate is in assembled and closed position;

Figure 9 is a fractional side elevational view of a portion of the outlet structure showing the dog in released position and the sealing pin retained in released position above the path of movement of the sliding gate;

Figure 10 is a sectional and side elevational view, taken along the line 10—10 of Figure 11, the outer end of an outlet structure having a modified form of construction wherein the locking dog is on the outer side of the frame to engage with the operating head instead of acting directly on the gate;

Figure 11 is a plan view of the structure shown in Figure 10;

Figure 12 is an end elevational view of the structure shown in Figure 10 as viewed from right to left;

Figure 13 is a vertical sectional view taken on a line 13—13 of Figure 11.

Referring first to the structure shown in Figures 1 through 9, the improvement is shown as applied to an outlet assembly used in connection with railway cars and the like. In said drawings, the load containing hopper is shown as including a four-sided hopper structure 5 formed of an inner side wall 6, an outer side wall 7, which meet with end walls 8 and 9. Surrounding the lower portion of said hopper is a frame 10 having walls 11, 12, 13, and 14 which overlie the walls 6, 7, 8, and 9 and below said overlying walls is a four-sided chute-like structure 16 which is disposed inwardly of the overlying walls a sufficient distance to provide horizontally extending walls 18, 19, 20, and 21, the walls 18, 19, and 20 constituting a ledge for supporting a sliding gate 22 in closed position. The gate 22 extends beyond the chute 16 through a slotted opening 23, the latter being formed in part by the lower horizontal wall 21 and the lower margin 24 of the overlying end wall 14.

The gate 22 is preferably formed on its underside with a series of rack teeth 25 and cooperating with said rack teeth are pinions 26 which are mounted on a shaft 27, the latter being rotatably mounted in bearings 28—28 formed in the sides of the frame. Any suitable means may be employed for rotating the shaft and for this purpose an operating head 29 is shown.

The frame 10 is provided with wings 30—30 and secured thereto are rail extensions 31—31 for supporting the gate in open position.

Cooperating with the outer end of the gate 22 to maintain the latter against opening movement is a dog 32 which is pivotally mounted on a ferrule 33 which in turn is formed integrally with an upward extension 34 or wall of one of the wings 30. The said extension or wall 34 and the dog 32 are respectively formed with key-shaped apertures 35 and 36 which are adapted to be disposed in registering alignment when the dog 32 is swung to latching position in the path of the gate as shown in Figure 2. In the claims the extension or wall 34 is referred to as a second wall.

The dog 32 is maintained in place in its latching position by means of an axially movable bolt 37, Figure 4, which is adapted to extend through the transversely aligned apertures 35 and 36. The bolt 37 which is preferably formed in one piece includes an elongated body section 38 having adjacent one end a key-shaped portion 39 with a perforation 39' for receiving a sealing element (not shown) and adjacent the opposite end the body section 38 of the bolt 37 is provided with a depending handle 40. The bolt 37 is mounted in a bearing structure which preferably includes a pair of walls indicated at 41 and 42, respectively, which are spaced from each other lengthwise of the bolt and are each formed with bearing apertures 43 within which the bolt 37 is mounted for axial and swinging movement. In the claims the wall 42 is referred to as a first wall and the wall 41 is referred to as a third wall. The bearing apertures 43 are of key-shaped formation corresponding substantially in shape to the shape of the key-shaped end of the bolt in order that the key-shaped end of the bolt may be threaded therethrough. The key-shaped apertures 43 are so located as to compel the positioning of the bolt at such an angle that the handle 40 during the threading operation will lie in the area occupied by the gate when the latter is in closed position or in fact in any position from open to closed.

The handle 40 is of sufficient length to extend in the path of movement of the gate 22 and consequently it is necessary that the bolt handle be swung outwardly and upwardly prior to the assembly of the gate 22 in the frame 10 thereby bringing the key-shaped portion 39 of the bolt out of registering alignment with the key-shaped aperture 43 in the adjacent wall 41.

The wall 41 is preferably located immediately adjacent to the dog 32 and includes a pocket 44, Figure 6, which is adapted to receive the key-shaped portion 39 of the bolt when it is in retracted position and free of the dog 32 for the purpose of maintaining the handle of said bolt in a substantially horizontal position above the path of movement of the gate. The dog 32 is formed with a stop 45 which engages with the edge portion 46 of the extension 34 to limit swinging movement of the dog and thus assure that the facing wall 47 of the dog 32 will act as a stop to prevent axial movement of the bolt 37 in a forward direction except when the aperture 36 of the dog 32 registers with the key-shaped portion 39 of the bolt 37.

The improved structure is conducive to ease of assembly and further enables the employment of parts of simple construction. The assembly is carried out in a series of simple assembly operations. Assuming the use of a frame 10 constructed as described, the assembly is carried out as follows. The bolt 37 is threaded in place as illustrated in Figures 5 to 7, inclusive, after which the handle 40 is lifted above the level of the gate 22 and the latter inserted. Thereafter the swinging movement of the bolt 37 is limited by the end face of the gate 22 as shown in conventional dot and dash lines in Figure 8 in which position the key-shaped portion 39 is out of registration with the aperture 43 in wall 41 and the projection provided by the key-shaped portion 39 then operates as an abutment to engage with the face 48 of the wall 41 and prevents total withdrawal of the bolt 37 while the gate 22 is positioned in the frame 10.

In the modified form of structure shown in Figures 10 to 13, inclusive, there is shown a structure wherein the dog operates to act directly on the shaft operating head to lock the door in place by means of the shaft.

In this structure 110 indicates the frame, 111 the sliding gate having rack teeth on the underside thereof, 112 the operating shaft with geared pinions 113 which interengage with the rack teeth and 114 the shaft operating head having a latching lug 115 with which a locking dog 116 engages. The dog 116 in this structure is on the outer side of the frame 110 and is pivotally mounted at 117 on an offset bracket portion 118 extending from the outer side of wall 119 referred to as a second wall in the claims.

The dog 116 is formed with a key-shaped aperture 120 which substantially conforms with the shape of the key-shaped end 121 of a sealing bolt 122 which extends through the bracket portion 118 and through another wall 123, referred to as a first wall in the claims, spaced therefrom lengthwise of the bolt. The said bolt 122 includes an elongated body portion 124 having the key-shaped end 121 at one end and a depending handle 125 adjacent the opposite end, which is of a length to extend in the plane of the gate 111. Key-shaped apertures 126 corresponding in shape to the shape of the key-shaped end 121 of the bolt 122 are provided in walls 119 and 123. These apertures 126 are disposed at such an angle as to preclude the insertion or removal of the bolt 122 while the gate 111 is positioned in the frame 110. A pocket 127 is provided in the wall 119 to receive the key-shaped end 121 of the bolt 122 when the latter is in retracted position and maintain the handle 125 thereof above the level of the gate 111.

In order to ensure the retention of the bolt 122 in a retracted position whenever the key-shaped aperture 120 in the dog 116 is not in registering alignment with the key-shaped end 121, the swinging movement of the dog 116 is limited by a stop 128 which engages the edge 129 of the bracket portion 118. Thus the swinging action of the dog 116 is limited to maintain the side face 130 of the latter in a plane parallel with the end of the bolt 122.

What is claimed as new is:

1. In a discharge outlet structure having a discharge opening and a slidably mounted gate for closing said opening, said gate being insertable in and removable from said structure only at one end and having a portion projecting outwardly beyond said one end, a first wall projecting from said one end of said structure above said gate, an axially movable one piece sealing bolt rockably and axially slidably mounted in an aperture in said first wall with one end of said bolt being key shaped and the other end having a radially extending arm in fixed relation to said key shaped end and gravitating into the path of movement of said gate and engaging said projecting portion thereof in closed position and otherwise engaging said gate in any operative position between open and closed position, said aperture in said first wall being key shaped to receive said key shaped end of said sealing bolt and positioned to receive the same only when said gate is not in operative position in said outlet structure, said first wall preventing the insertion of said key shaped end of said sealing bolt in said key shaped aperture when said arm is prevented by said gate from being placed in the position in which said key shaped end registers with said key shaped aperture, a second wall projecting from said one end of said outlet structure parallel to said first wall and having an aperture therein aligned with said bolt to receive said key shaped end thereof, and a dog pivotally mounted on said second wall and swingable to a latching position to hold said gate in closed position and having a key shaped aperture therein aligned with said bolt to receive said key shaped end of said sealing bolt therethrough when said dog is in latching position to hold the latter in latching position.

2. The invention as set forth in claim 1 wherein the sealing bolt is movable through the key shaped aperture in the dog to extend beyond the same and the second wall has a key shaped aperture in registry with said key shaped aperture in said dog when the same is in latching position to receive the key shaped end of the sealing bolt after the same has been threaded through said aperture in said dog.

3. The invention as set forth in claim 1 wherein the second wall has a pocket in registry with and adapted to receive the key shaped end of the sealing bolt when it is in retracted position and hold the same in a position in registry with the key shaped aperture in the dog when it is in latching position.

4. The invention as set forth in claim 1 wherein the key shaped end of the sealing bolt and the arm extending radially therefrom are positioned in a common plane.

5. The invention as set forth in claim 1 wherein the sealing bolt is rockably and axially slidably mounted in a pair of bearing walls projecting outwardly from the one end of the structure one of which is the first wall, the other is a third wall, both having registering key shaped apertures and the third wall has a pocket in registry with and adapted to receive the key shaped end of the sealing bolt when it is in retracted position and hold the same in a position in registry with the key shaped aperture in the dog when it is in latching position.

6. The invention as set forth in claim 1 wherein the dog has contact engagement with the gate in the latching position.

7. The invention as set forth in claim 1 wherein the gate is moved by a shaft rotatably mounted on the outlet structure and interengaging rack and pinion means carried by said gate and shaft respectively, a lug projects radially from said shaft, and the dog reacts against said lug in latching position to hold said gate closed.

References Cited in the file of this patent

UNITED STATES PATENTS

| | | |
|---|---|---|
| 777,456 | Wands | Dec. 13, 1904 |
| 2,072,292 | Campbell | Mar. 2, 1937 |
| 2,142,236 | Campbell | Jan. 3, 1939 |
| 2,222,280 | Batho | Nov. 19, 1940 |
| 2,631,877 | Ainsworth | Mar. 17, 1953 |